US008496517B2

(12) United States Patent
Neuer

(10) Patent No.: US 8,496,517 B2
(45) Date of Patent: Jul. 30, 2013

(54) NUMBER GUESSING GAME

(76) Inventor: Mitchell Mannes Neuer, Sammamish, WA (US)

( * ) Notice: Subject to any disclaimer, the term of this patent is extended or adjusted under 35 U.S.C. 154(b) by 336 days.

(21) Appl. No.: 12/942,083

(22) Filed: Nov. 9, 2010

(65) Prior Publication Data

US 2012/0115558 A1 May 10, 2012

(51) Int. Cl.
*A63F 9/24* (2006.01)
*G06F 17/00* (2006.01)

(52) U.S. Cl.
USPC ................. 463/9; 273/139; 273/272; 273/16; 463/17

(58) Field of Classification Search
None
See application file for complete search history.

(56) References Cited

U.S. PATENT DOCUMENTS

| | | | | |
|---|---|---|---|---|
| 3,825,255 | A * | 7/1974 | Kennard et al. | 273/139 |
| 4,251,078 | A | 2/1981 | Meirovitz | |
| 4,375,666 | A | 3/1983 | Buck et al. | |
| 4,565,373 | A | 1/1986 | Ungar | |
| 5,344,199 | A * | 9/1994 | Carstens et al. | 463/17 |
| 6,340,159 | B1 * | 1/2002 | Giangrante | 273/272 |
| 6,565,085 | B1 | 5/2003 | Kornafel | |
| 6,746,328 | B2 * | 6/2004 | Cannon et al. | 463/17 |
| 7,431,299 | B2 | 10/2008 | Darling | |
| 7,654,533 | B2 | 2/2010 | Seal | |
| 7,785,180 | B1 * | 8/2010 | von Ahn et al. | 463/9 |
| 7,887,058 | B2 * | 2/2011 | Ritter et al. | 273/249 |
| 2003/0104852 | A1 | 6/2003 | Duhamel | |
| 2005/0014549 | A1 * | 1/2005 | Baerlocher et al. | 463/16 |

* cited by examiner

*Primary Examiner* — Paul A D'Agostino
(74) *Attorney, Agent, or Firm* — DLC Patents, PLLC; Dustin L. Call

(57) ABSTRACT

One example embodiment includes a method of playing a game. The method includes providing a first player and a second player with a sum of money. Each sum of money is within predetermined minimum and maximum thresholds. The sum of money provided to the first player is the first player's current balance. The sum of money provided to the second player is the second player's current balance. The method also includes allowing the first player to guess the second player's current balance and adjusting the first player's balance based on the first player's guess. Adjusting the first player's balance can be based on whether the first player's guess is too high or too low relative to the second player's current balance.

19 Claims, 6 Drawing Sheets

NUMBER GUESSING GAME

CROSS-REFERENCE TO RELATED APPLICATIONS

Not applicable.

BACKGROUND OF THE INVENTION

Intellectual stimulation is important for human beings. It provides our brains with flexibility and keeps our minds healthy. It is especially important that our brains be given a chance to solve puzzles or other problems. This increases reaction time and helps our brains to problem solve more effectively.

In addition, social activities are an important part of most of our lives. Many people enjoy being with family and friends. Games especially provide us with an opportunity to be social while having fun. In particular games provide a good excuse to be with people whose company we enjoy and can provide the intellectual stimulation that we need.

Some games allow users to use math or other skills. In particular, games that allow users to perform math skills can help the user practice fundamental mathematics such as addition and subtraction while the user has fun. This, in turn, removes the pressure of tedious practice from the user. That is, the user can practice the skills while having fun instead of practice for practice's sake. This makes it more likely for the user to practice for an extended amount of time and helps the user to retain the skills better.

In addition, games that focus the mathematics on currency are more likely to retain the user's interest. These games provide us with a "reward" for improving our skills. The reward may be monetary, with the user allowed to win currency, as in gambling or casino games. Alternatively, the reward can be prizes, satisfaction for high scores, additional game currency or any other reward.

Accordingly, there is a need in the art for a game that allows users to exercise math skills. In addition, there is a need in the art for a game that allows the user to have fun while using math skills. Further, there is a need in the art for a game that allows the user to compete with other players while using math skills.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a method of playing a game. The method includes providing a first player and a second player with a sum of money. Each sum of money is within predetermined minimum and maximum thresholds. The sum of money provided to the first player is the first player's current balance. The sum of money provided to the second player is the second player's current balance. The method also includes allowing the first player to guess the second player's current balance and adjusting the first player's balance based on the first player's guess. Adjusting the first player's balance based on the first player's guess includes transferring the amount guessed by the first player to the first player's current balance from the second player's current balance if the amount guessed is lower than the second player's current balance. Adjusting the first player's balance based on the first player's guess also includes leaving player balances unchanged if the amount guessed by the first player is higher than the second player's current balance. Adjusting the first player's balance based on the first player's guess further includes transferring the amount guessed by the first player to the first player's current balance from the second player's current balance and declaring the first player the winner if the amount guessed matches the second player's current balance.

Another example embodiment includes a method of playing a number guessing game. The method includes a first player joining and a second player joining, where the second player is the first player's opponent. The method also includes providing a first player and a second player with a sum of money. Each sum of money is random and is within predetermined minimum and maximum thresholds. The sum of money provided to the first player is the first player's current balance. The sum of money provided to the second player is the second player's current balance. The method further includes allowing the first player to guess the second player's current balance and adjusting the first player's balance based on the first player's guess. Adjusting the first player's balance based on the first player's guess includes transferring the amount guessed by the first player to the first player's current balance from the second player's current balance if the amount guessed is lower than the second player's current balance. Adjusting the first player's balance based on the first player's guess also includes leaving player balances unchanged if the amount guessed by the first player is higher than the second player's current balance. Adjusting the first player's balance based on the first player's guess further includes transferring the amount guessed by the first player to the first player's current balance from the second player's current balance and declaring the first player the winner if the amount guessed matches the second player's current balance. The method further includes allowing the second player to guess the first player's current balance and adjusting the second player's balance based on the second player's guess. Adjusting the second player's balance based on the second player's guess includes transferring the amount guessed by the second player to the second player's current balance from the first player's current balance if the amount guessed is lower than the first player's current balance. Adjusting the second player's balance based on the second player's guess also includes leaving player balances unchanged if the amount guessed by the second player is higher than the first player's current balance. Adjusting the second player's balance based on the second player's guess further includes transferring the amount guessed by the second player to the second player's current balance from the first player's current balance and declaring the second player the winner if the amount guessed matches the first player's current balance.

Another example embodiment includes a system embodied on a computer-readable storage medium bearing computer-executable instructions that, when executed by a logic device, carries out a method for playing a number guessing game. The system includes a logic device and one or more computer readable media, where the one or more computer readable media contain a set of computer-executable instructions to be executed by the logic device. The set of computer-executable instructions is configured to provide a first player and a second player with a sum of money. Each sum of money is within predetermined minimum and maximum thresholds. The sum of money provided to the first player is the first player's current balance. The sum of money provided to the second player is the second player's current balance. The set of computer-executable instructions is also configured to allow the first player to guess the second player's current balance and adjust the first player's balance based on the first player's guess. Adjusting the first player's balance based on the first player's guess includes transferring the amount guessed by the first player to the first player's current balance from the second player's current balance if the amount guessed is lower than the second player's current balance. Adjusting the first player's balance based on the first player's guess also includes leaving player balances unchanged if the amount guessed by the first player is higher than the second player's current balance. Adjusting the first player's balance based on the first player's guess further includes transferring the amount guessed by the first player to the first player's current balance from the second player's current balance and declaring the first player the winner if the amount guessed matches the second player's current balance.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
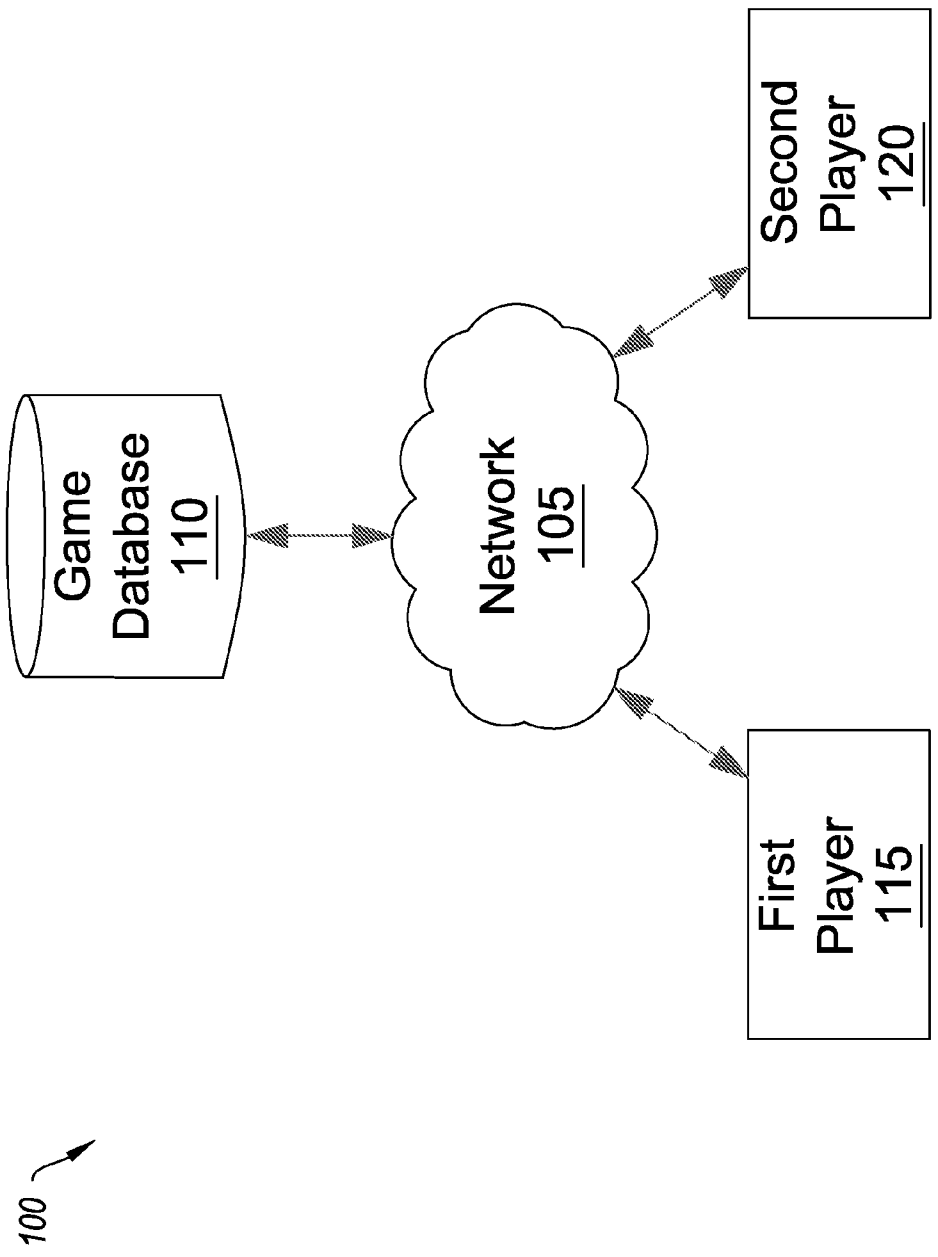
FIG. 1 illustrates a block diagram of a system for allowing users to connect to one another to play a number guessing game.

FIG. 1 illustrates a block diagram of a system 100 for allowing users to connect to one another to play a number guessing game. In at least one implementation, the system 100 can allow users to connect with other users with other users in order to compete against one another in the number guessing game. Additionally or alternatively, the system 100 can allow a user to compete against a computer player in the number guessing game, as described below FIG. 1 shows that the system 100 can include a network 105. In at least one implementation, the network 105 can be used to connect the various parts of the system 100 to one another. The network 105 exemplarily includes the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network 105 includes one or more cellular RF networks and/or one or more wired and/or wireless networks such as, but not limited to, 802.xx networks, Bluetooth access points, wireless access points, IP-based networks, or the like. The network 105 can also include servers that enable one type of network to interface with another type of network.

FIG. 1 also shows that the system 100 can include a game database 110. In at least one implementation, the game database 110 can store one or more applications. For example the game database 110 can allow access to download the one or more applications over the network 105. Additionally or alternatively, the game database 110 can be connected to other hardware which is configured to run the one or more applications which are accessed over the network 105. For example, the game database 110 can be connected to one or more microprocessors which are configured to run the one or more applications and transmit data over the network 105 to one or more users.

In at least one implementation, the game database 110 can be a centralized database on which all game applications are stored. Additionally or alternatively, the game database 110 can include different databases, with users connecting to the different databases based on ease of use or user preference. For example, the user can automatically be connected to the nearest database in geographic terms. Additionally or alternatively, the user can select a particular database, in order to connect with other users or to play a particular game application. For example, a user can navigate to web pages associated with the game database 110 and download game applications. It should be noted that "Web Page" as used herein refers to any online posting, including domains, subdomains, Web posts, Uniform Resource Identifiers ("URIs"), Uniform Resource Locators ("URLs"), images, videos, or other piece of content and non-permanent postings such as e-mail and chat unless otherwise specified. One skilled in the art will appreciate, however, that any delivery system of the game application to the users is within the scope of the invention. Therefore, the delivery method of the game application from the game database 110 to the users should not be seen as limiting the invention, as described herein, unless otherwise specified in the claims.

FIG. 1 also shows that the system 100 can include a first player 115 connected to the network 105. In particular, the network 105 can allow the first player 115 to connect to the game database 110 over the network 105. In at least one implementation, the first player 115 can include any individual who desires to connect to the game database over the network 105. In particular, the first player 115 can include any individual who is seeking to play a game located in the game database 110 over the network 105.

FIG. 1 further shows that the system 100 can include a second player 120 connected over the network 105. In at least one implementation, the second player 120 can include an individual who desires to compete against the first player 115. Additionally or alternatively, the second player 120 can include a computer player. That is, the second player 120 can include a computer program designed to compete against human players.

In at least one implementation, the first player 115 can connect with the second player 120 over the network 105.

That is, the first player 115 can communicate with the second player 120 independent of the game application. Additionally or alternatively, the first player 115 and the second player 120 can be connected only through the game application. That is, communication between the first player 115 and the second player 120 can be limited only to communications allowed by the game application.

Figure 2:
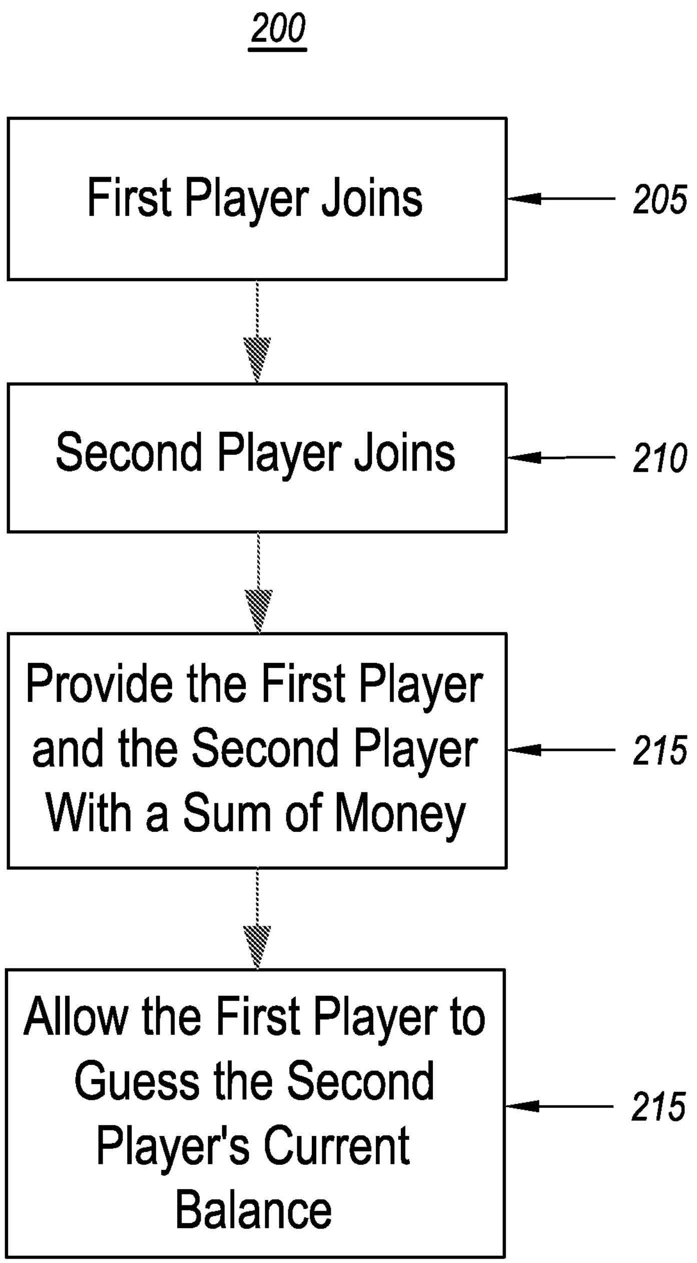
FIG. 2 is a flowchart illustrating a method of playing a number guessing game.

FIG. 2 is a flowchart illustrating a method 200 of playing a number guessing game. One of skill in the art will appreciate that the method 200 can be performed using the system 100 of FIG. 1; however, the method 200 can be performed using a system other than the system 100 of FIG. 1.

FIG. 2 shows that the method 200 can include a first player joining 205. In at least one implementation, the first player joining 205 can include a first player connecting to a game database over a network, as described above. Additionally or alternatively, the first player joining 205 can include the first player selecting the conditions of the game and starting a game. That is, the first player can select any available options for the game, if such options are available, as discussed below.

In at least one implementation, in order for the first player to join 205, the first player can be required to meet certain conditions. For example, the first player can be required to register, log in, or otherwise indicate his or her identity to the server. Additionally or alternatively, the first player can be required to purchase a certain balance of currency. That is, the number guessing game can involve currency, either virtual or physical, that the first player is required to provide or purchase prior to joining the game. Additionally or alternatively, the first player can be required to submit age or residency information. For example, if the game involves the exchange of money, the first player can be required to submit information showing that the first player is of a legal age and residency to conduct online payment transactions.

FIG. 2 also shows that the method 200 can include a second player joining 210. In at least one implementation, the second player is the first player's opponent. That is, the second player can compete with the first player to determine who is the winner of the game, as described below.

In at least one implementation, the second player can include a human player. That is, the second player can include an individual who joins the game in order to compete with the first player. The second player can join specifically to compete with the first player or can be presented with a list of games and choose which game to join, based on the first player or the game options. Additionally or alternatively, the second player can include a computer player. That is, the second player can include a computer program which is programmed to compete with human players. The computer player can include options which specify how difficult it is for the human player to beat the computer player.

FIG. 2 further shows that the method 200 can include providing the first player and the second player with a sum of money 215. In at least one implementation, the sum of money can include a value between a minimum and a maximum threshold. In particular, the game conditions can dictate the minimum and maximum thresholds. The first player can set this condition, as discussed above. Additionally or alternatively, the game can include pre-set minimum and maximum thresholds. For example, the minimum threshold could be $1 and the maximum threshold could be $100, $1,000 or $10,000. Additionally or alternatively, the minimum and maximum threshold could be determined randomly In at least one implementation, the sum of money can be random. That is, the first player and the second player can each be given a random sum of money assigned by a computer or using some other method. Additionally or alternatively, the first player and the second player can be allowed to pick the sum of money within the minimum and maximum threshold.

In at least one implementation, the sum of money provided to the second player can be kept secret from the first player and vice versa. That is, the players can have hidden the opposing player's current balance. Additionally or alternatively, the players can have a hint provided about the opposing player's sum of money. For example, one or both of the players can have displayed their opponent's maximum possible balance, as described above.

FIG. 2 also shows that the method 200 includes allowing the first player to guess the second player's current balance. In at least one implementation, the first player can guess any value between the minimum and double the maximum threshold minus one. As described below, the current balance can change through the course of the game. Therefore, either player can have, at some point in the game, a total between the minimum threshold and double the maximum threshold minus one.

In at least one implementation, the first player can be provided with a hint regarding how close the first player was to guessing the second player's current balance. For example, the first player can be given the following hints: "cold" if the guess is equal to or over 75% distant from the correct guess, compared to the overall possible range of guesses; "lukewarm" if the guess is between 26% and 74% distant from the correct guess, compared to the overall possible range of guesses; and "hot" if the guess is less than or equal to 25% distant from the correct guess, compared to the overall possible range of guesses.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3:
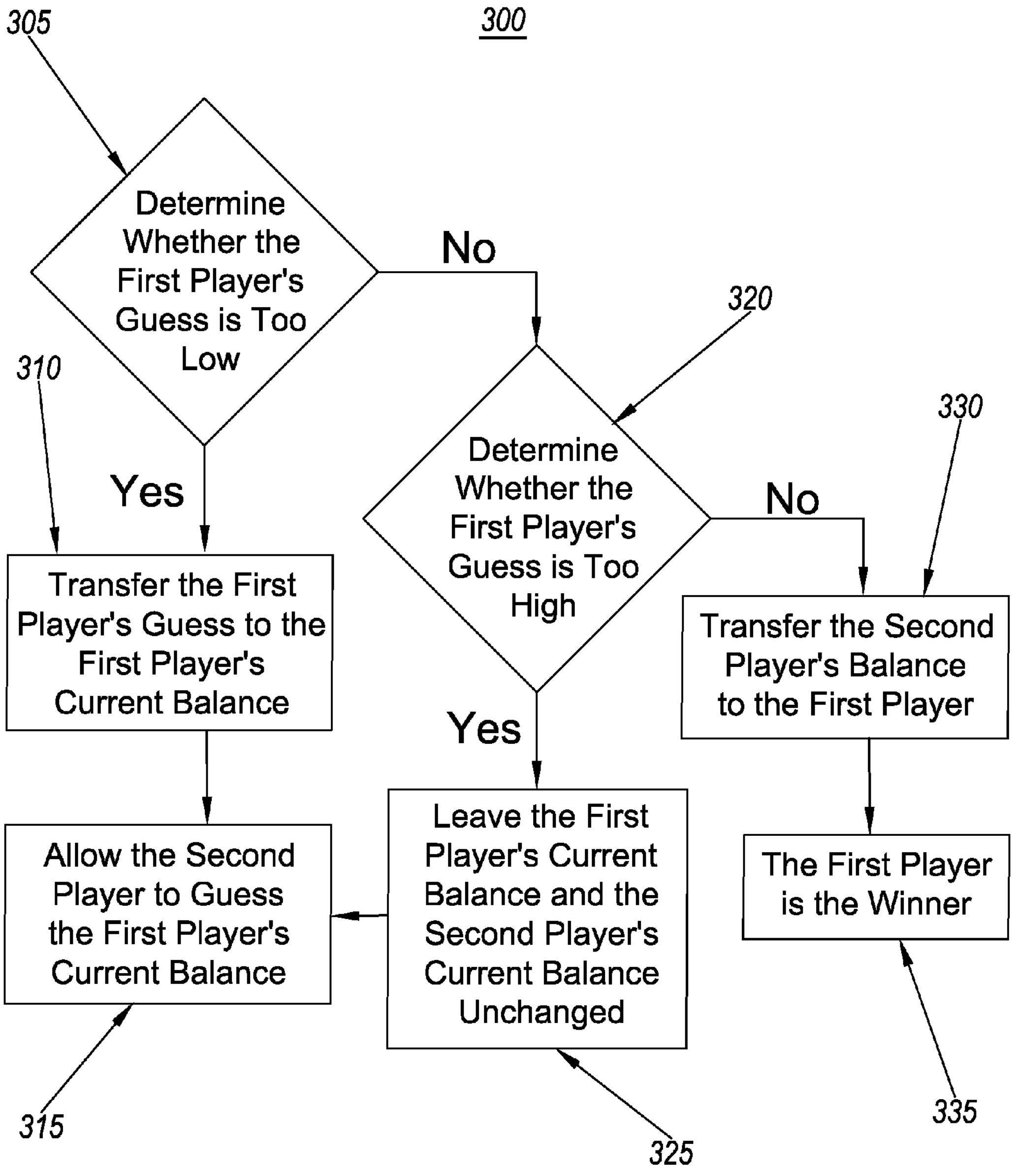
FIG. 3 is a flow chart illustrating a method of adjusting a player's balance based on a guess.

FIG. 3 is a flow chart illustrating a method 300 of adjusting a player's balance based on a guess. In at least one implementation, adjusting a player's balance can allow the balances of each player to change throughout a number guessing game. One of skill in the art will appreciate that as each player guesses that player can be treated as the "first" player. I.e., the guessing player can be considered the first player regardless of the order in which players join the game.

FIG. 3 shows that the method 300 can include determining whether the first player's guess is too low 305. In at least one implementation, determining whether the first player's guess is too low includes comparing the first player's guess to the second player's current balance. Comparing the first player's guess to the second player's current balance can include using software that compares the numbers, can include mechanical devices, such as a comparator, or can include any other method of determining whether the first player's guess is lower than the second player's current balance.

FIG. 3 also shows that the method 300 can include transferring the amount of the first player's guess to the first player's current balance 310 if the first player's guess is lower than the second player's current balance. I.e. if the first player's guess is lower than the second player's current balance the amount of the first player's guess can be taken from the second player and given to the first player.

FIG. 3 further shows that the method 300 can include allowing the second player to guess the first player's current balance 315. In at least one implementation, once the second player guesses, the method 300 can be used to adjust the players' balance based on the guess. I.e., the players' balances can be adjusted based on the second player's guess in accordance with the method 300 switching the role of the first player and the second player.

FIG. 3 also shows that the method 300 can include determining whether the first player's guess is too high 320 if the first player's guess is too high. In at least one implementation, determining whether the first player's guess is too high 320 can be combined with determining whether the first player's guess is too low 305. For example, the first player's guess can be subtracted from the second player's current balance. If the result is a positive non-zero integer then the first player's guess is too low. In contrast, if the result is a negative non-zero integer then the first player's guess is too high.

FIG. 3 further shows that the method 300 can include leaving the first player's current balance and the second player's current balance unchanged 325 if the first player's guess is too high. That is, there is no change in player balances if the amount guessed by the first player is higher than the second player's balance. The second player can then be allowed to guess the first player's current balance, as described above.

FIG. 3 also shows that the method 300 includes transferring the second player's balance to the first player 330 if the first player's guess is not too high. I.e., because the first player's guess is neither too low nor too low, the guess must have matched the second player's current balance. Therefore, the first player receives the total of both player's balance for guessing correctly.

FIG. 3 further shows that the method 300 includes the first player winning the game 335. In at least one implementation, by winning, the first player can retain the full amount of both player's balance. I.e., the first player retains his opening balance and additionally receives the second player's opening balance. Additionally or alternatively, the first player can receive both player's balance minus some amount. For example, if the players bought in, as described above, then some amount can be taken from the total or from the amount one from the second player's opening balance and given to the house. The amount can include a set amount or a percentage of the winnings. For example, the amount could be $10 or could be 10% of the winnings. Additionally or alternatively, each player can be required to buy in for some amount that is unrelated to the players' balances. Upon winning the first player can receive the second player's buy in amount.

Figure 4A:
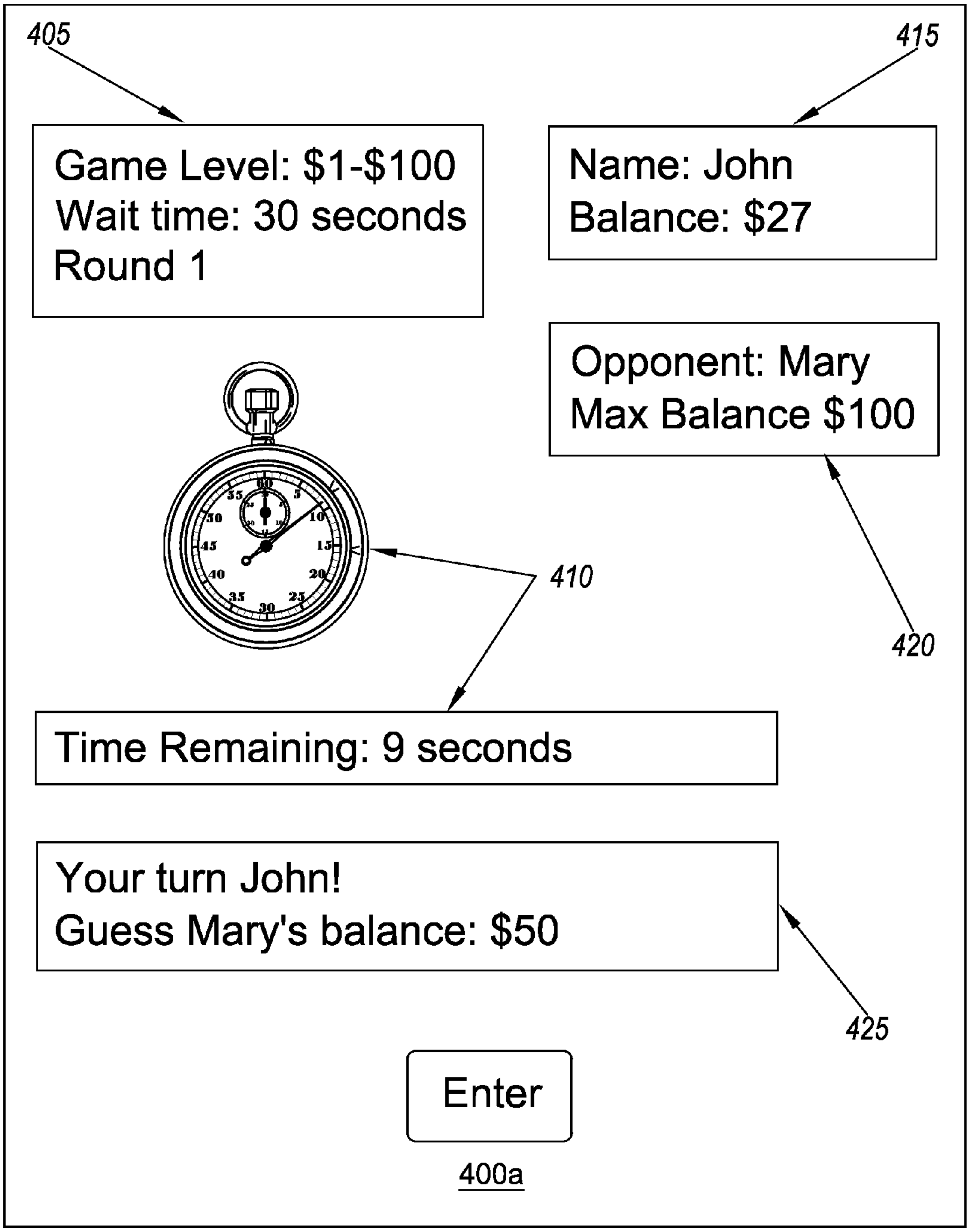
FIG. 4A illustrates an example of the game interface for the first player.
Figure 4B:
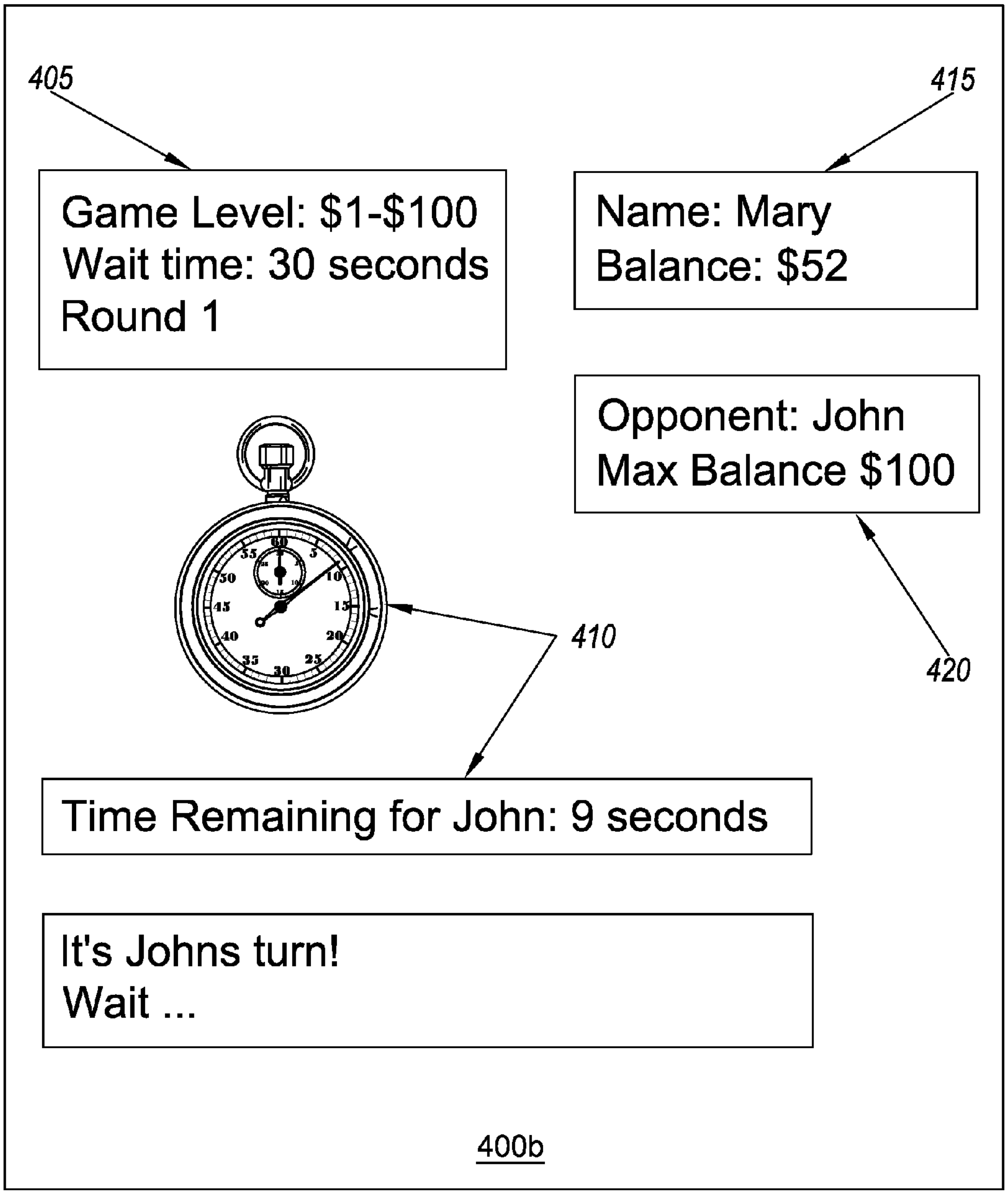
FIG. 4B illustrates an example of the game interface for the second player.

FIGS. 4A and 4B illustrate an example of a game interface 400. FIG. 4A illustrates an example of the game interface 400*a* for the first player; and FIG. 4B illustrates an example of the game interface 400*b* for the second player (collectively "game interface 400"). In at least one implementation, the game interface 400 can allow a first player and a second player to play a number guessing game against one another. I.e., the game interface 400 can provide all of the information necessary for a first player and a second player to compete with one another in a number guessing game.

FIGS. 4A and 4B show that the game interface 400 can include a game options display 405. In at least one implementation, the game options display 405 can include an indicator of the minimum and maximum thresholds for game play, as described above. Additionally or alternatively, the game options display 405 can include the time allowed for each turn. I.e., each player can be given a certain period of time, within which the player must make his or her guess. For example, each player can be given 30 seconds, 45 seconds, 60 seconds or an unlimited amount of time to make a guess.

FIGS. 4A and 4B also show that the game interface 400 can include a time remaining indicator 410. In at least one implementation, the time remaining indicator 410 can display the amount of time left for the current player to make a guess. The time remaining indicator 410 can display time remaining using a digital display, an analog display or both.

FIGS. 4A and 4B further show that the game interface 400 can include a current balance 415. In at least one implementation, the current balance 415 is the current balance 415 of the player. I.e., the current balance 415 of the first player can be shown in the game interface 400*a* only to the first player and the current balance 415 of the second player can be shown in the game interface 400*b* only to the second player.

FIGS. 4A and 4B also show that the game interface 400 can include an indicator of the opponent's maximum possible balance 420. In at least one implementation the indicator of the opponent's maximum possible balance 420 can be provided to the players in order to help the players make their guesses. I.e., the indicator of the opponent's maximum possible balance 420 can be provided in order to make the game easier for newer or less advanced players.

In at least one implementation, the indicator of the opponent's maximum possible balance 420 is updated after each guess. For example, the indicator of opponent's maximum possible balance 420 can be equal to the lesser of the previous maximum possible balance or the amount of the first player's guess minus one. I.e., if the player has guessed higher than the indicator of opponent's maximum possible balance 420, the opponent's maximum possible balance 420 can be left unchanged; if the player has guessed lower than the opponent's maximum possible balance 420 but still higher than the opponent's balance, the opponent's maximum balance 420 can be changed to the guess minus 1. Additionally or alternatively, if the player has guessed too low, and the amount of the guess has been transferred from the second player to the first player, the indicator of the opponent's maximum remain balance 420 can be changed to the previous maximum possible balance minus the amount guessed by the first player in the game interface 400*a* and to the previous maximum possible balance plus the amount guessed by the first player in the game interface 400*b*.

FIG. 4A further shows that the game interface 400*a* can include a blank 425 for the first player to enter a guess. In at least one implementation, the first player can type in the desired amount into the blank 425. Additionally or alternatively, the first player can enter the desired amount into the blank 425 through a digital keypad provided in the game interface 400.

An example of game play will now be provided. This example is intended only to help one of skill in the art understand the method of game play and should not be considered limiting.

The game begins with the first player randomly allocated $27 and the second player randomly allocated $52. The first player is chosen to start. In round 1, the first player guesses $50 and wins $50 from the second player. Thus the first player's balance is $77 and the second player's balance is $2. The second player then guesses $100 ($50 initial binary amount+$50 just won from her). This is more than the first player's current balance, so there is no change in balances.

In round 2 the first player guesses $25 (half of the second player's maximum of $50). This is more than the second player has, so there is no change in balances. The second player guesses: $75 ($50 taken from her in round 1+$25). She wins $75 from the first player. The first player's balance is $2; the second player's balance is $77.

In round 3 the first player guesses: $87 ($75 taken from him in round 2+$12). This is more than the second player has, so there is no change in balances. The second player guesses $12. This is more than the first player has, so there no change in balances. The first player's balance is $2; the second player's balance is $77.

In round 4 the first player guesses: $81 ($75 taken from him in round 2+$6). This is more than the second player has, so there is no change in balances. The second player guesses $6. This is more than the first player has, so there is no change in balances. The first player's balance is $2; the second player's balance is $77.

In round 5 the first player guesses: $78=($75 taken from him in round 2+$3). This is more than the second player has, so there is no change in balances. The second player guesses $3. This is more than the first player has, so there is no change in balances. The first player's balance is $2; the second player's balance is $77.

In round 6 the first player guesses: $76=($75 taken from him in round 2+$1). He wins it from the second player. The first player's balance is $78; the second player's balance is $1. The second player guesses: $78=($76 just taken from her+$2). This is exactly the first player's balance; therefore the second player wins the game and the total of $79.

Figure 5:
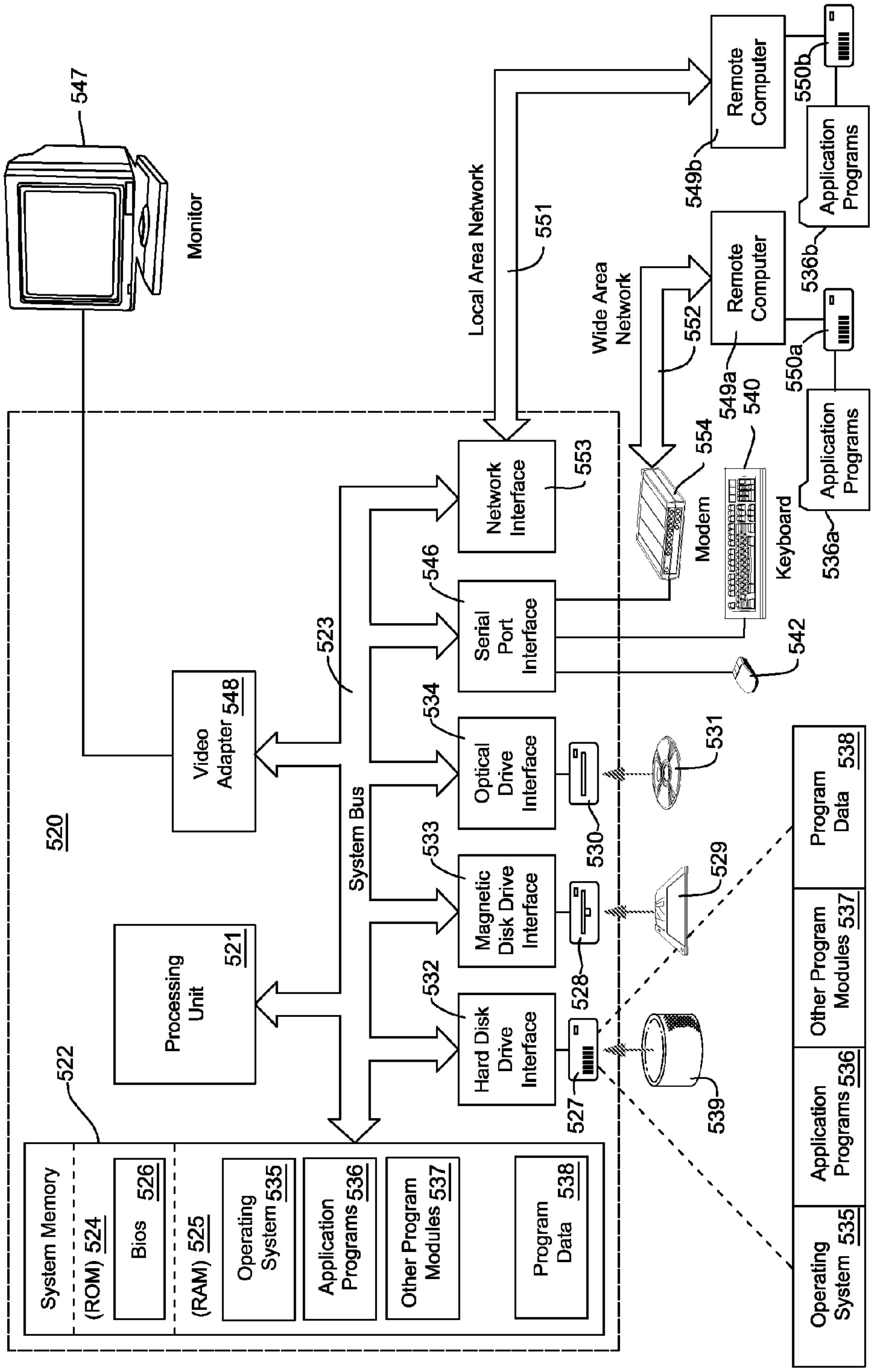
FIG. 5 illustrates an example of a suitable computing environment in which the invention may be implemented.

FIG. 5, and the following discussion, are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

One skilled in the art will appreciate that the invention may be practiced in network computing environments with many types of computer system configurations, including personal computers, hand-held devices, mobile phones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an example system for implementing the invention includes a general purpose computing device in the form of a conventional computer 520, including a processing unit 521, a system memory 522, and a system bus 523 that couples various system components including the system memory 522 to the processing unit 521. It should be noted however, that as mobile phones become more sophisticated, mobile phones are beginning to incorporate many of the components illustrated for conventional computer 520. Accordingly, with relatively minor adjustments, mostly with respect to input/output devices, the description of conventional computer 520 applies equally to mobile phones. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disc drive 530 for reading from or writing to removable optical disc 531 such as a CD-ROM or other optical media. The magnetic hard disk drive 527, magnetic disk drive 528, and optical disc drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disc 531, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 539, magnetic disk 529, optical disc 531, ROM 524 or RAM 525, including an operating system 535, one or more application programs 536, other program modules 537, and program data 538. A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549*a* and 549*b*. Remote computers 549*a* and 549*b* may each be another personal computer, a server, a router, a network PC, a peer device or other common network node, and typically include many or all of the elements described above relative to the computer 520, although only memory storage devices 550*a* and 550*b* and their associated application programs 536*a* and 536*b* have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 can be connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system embodied on a computer-readable storage medium bearing computer-executable instructions that, when executed by a logic device, carries out a method for playing a number guessing game, the system comprising:

a logic device;

one or more computer readable media, wherein the one or more computer readable media contain a set of computer-executable instructions to be executed by the logic device, the set of computer-executable instructions configured to:

provide a first player and a second player with a sum of money, wherein:

each sum of money is within predetermined minimum and maximum thresholds;

the sum of money provided to the first player is the first player's current balance; and the sum of money provided to the second player is the second player's current balance;

allow the first player to guess the second player's current balance; and adjust the first player's balance based on the first player's guess, wherein adjusting the first player's balance based on the first player's guess includes:

transferring the amount guessed by the first player to the first player's current balance from the second player's current balance if the amount guessed is lower than the second player's current balance;

leaving player balances unchanged if the amount guessed by the first player is higher than the second player's current balance; and transferring the amount guessed by the first player to the first player's current balance from the second player's current balance and declaring the first player the winner if the amount guessed matches the second player's current balance.

2. The system of claim 1, wherein the minimum threshold is $1.

3. The system of claim 1, wherein the maximum threshold is $100.

4. The system of claim 1, wherein the maximum threshold is $1,000.

5. The system of claim 1, wherein the maximum threshold is $10,000.

6. The system of claim 1 further comprising:

displaying to the first player the second player's maximum possible balance.

7. The system of claim 6, wherein the second player's maximum possible balance is equal to the maximum threshold before either the first player or the second player has guessed.

8. The system of claim 7, wherein the second player's maximum possible balance is updated after the first player has guessed, wherein the maximum possible balance is equal to the lesser of:

the previous maximum possible balance; or the amount of the first player's guess minus 1 if the first player guessed an amount higher than the second player's balance.

9. The system of claim 7, wherein the maximum possible balance is updated after the first player has guessed, wherein the maximum possible balance is equal to the previous maximum possible balance minus the amount guessed by the first player if the first player guessed an amount lower than the second player's balance.

10. The system of claim 1, the method further comprising:

allowing the second player to guess the first player's current balance; and adjusting the second player's balance based on the second player's guess, wherein adjusting the second player's balance based on the second player's guess includes:

transferring the amount guessed by the second player to the second player's current balance from the first player's current balance if the amount guessed is lower than the first player's current balance;

leaving player balances unchanged if the amount guessed by the second player is higher than the first player's current balance; and transferring the amount guessed by the second player to the second player's current balance from the first player's current balance and declaring the second player the winner if the amount guessed matches the first player's current balance.

11. A system embodied on a computer-readable storage medium bearing computer-executable instructions that, when executed by a logic device, carries out a method for playing a number guessing game, the system comprising:

a logic device;

one or more computer readable media, wherein the one or more computer readable media contain a set of computer-executable instructions to be executed by the logic device, the set of computer-executable instructions configured to:

join a first player to the game;

join a second player to the game, wherein the second player is the first player's opponent;

provide the first player and the second player with a sum of money, wherein:

each sum of money is random;

each sum of money is within predetermined minimum and maximum thresholds;

the sum of money provided to the first player is the first player's current balance; and the sum of money provided to the second player is the second player's current balance;

the first player to guess the second player's current balance;

adjust the first player's balance based on the first player's guess, wherein adjusting the first player's balance based on the first player's guess includes:

transfer the amount guessed by the first player to the first player's current balance from the second player's current balance if the amount guessed is lower than the second player's current balance;

leave player balances unchanged if the amount guessed by the first player is higher than the second player's current balance; and transfer the amount guessed by the first player to the first player's current balance from the second player's current balance and declaring the first player the winner if the amount guessed matches the second player's current balance;

allow the second player to guess the first player's current balance; and adjust the second player's balance based on the second player's guess, wherein adjusting the second player's balance based on the second player's guess includes:

transfer the amount guessed by the second player to the second player's current balance from the first player's current balance if the amount guessed is lower than the first player's current balance;

leave player balances unchanged if the amount guessed by the second player is higher than the first player's current balance; and transfer the amount guessed by the second player to the second player's current balance from the first player's current balance and declaring the second player the winner if the amount guessed matches the first player's current balance.

12. The system of claim 11, wherein the first player's balance is hidden from the second player.

13. The system of claim 12, wherein the second player's balance is hidden from the first player.

14. The system of claim 11, wherein the first player and second player are provided with an indication of how close their guess is to the opposing player's balance.

15. The system of claim 14, wherein the indication includes:

"cold" if the guess is equal to or over 75% distant from the correct guess, compared to the overall possible range of guesses;

"lukewarm" if the guess is between 26% and 74% distant from the correct guess, compared to the overall possible range of guesses; and "hot" if the guess is less than or equal to 25% distant from the correct guess, compared to the overall possible range of guesses.

16. The system of claim 1, wherein the second player is a computer player.

17. The system of claim 1 further comprising connecting the first player to the second player over a network.

18. The system of claim 1, wherein the first player must deposit an amount of money greater than the maximum threshold before playing.

19. The system of claim 18, wherein the first player deposits the money using a credit card.

* * * * *